Oct. 8, 1968     H. CHANOWITZ     3,404,447
APPARATUS FOR MAKING SEALED SWITCHES
Filed March 18, 1965     11 Sheets-Sheet 1

Fig. 1

INVENTOR
HARRY CHANOWITZ
by
Mason, Kolehmainen, Rathburn and Wyss
ATTORNEYS

Oct. 8, 1968  H. CHANOWITZ  3,404,447
APPARATUS FOR MAKING SEALED SWITCHES
Filed March 18, 1965  11 Sheets-Sheet 2

INVENTOR
HARRY CHANOWITZ
Mason, Kolehmainen,
Rathburn and Wyss
ATTORNEYS.

INVENTOR
HARRY CHANOWITZ
by Mason, Kolehmainen,
Rathburn and Wyss
ATTORNEYS.

Oct. 8, 1968  H. CHANOWITZ  3,404,447
APPARATUS FOR MAKING SEALED SWITCHES
Filed March 18, 1965  11 Sheets-Sheet 9

INVENTOR
HARRY CHANOWITZ
by Mason, Kolehmainen,
Rathburn and Wyss.
ATTORNEYS.

Oct. 8, 1968 H. CHANOWITZ 3,404,447
APPARATUS FOR MAKING SEALED SWITCHES
Filed March 18, 1965 11 Sheets-Sheet 11

INVENTOR
HARRY CHANOWITZ
by
Mason, Kolehmainen,
Rathburn and Wyss
ATTORNEYS

United States Patent Office 3,404,447
Patented Oct. 8, 1968

3,404,447
APPARATUS FOR MAKING SEALED SWITCHES
Harry Chanowitz, Skokie, Ill., assignor to C. P. Clare & Company, Chicago, Ill., a corporation of Delaware
Filed Mar. 18, 1965, Ser. No. 440,697
14 Claims. (Cl. 29—203)

ABSTRACT OF THE DISCLOSURE

A sealed reed switch making machine in which glass tubes stacked end-to-end are dropped in sequence to be held in assembly position on successive moving switch making heads. Reeds are fed in sequence through aligning slots in two similar guide structures for the upper and lower reeds to rest at one end on a magnet that detachably and magnetically mounts the other end of the reed on the guide structure until it is picked up by upper and lower reed chucks on successive heads and inserted into the open ends of the glass tube. A guide slidably receiving the reed at one end and a resilient member bearing against the reed at the other end prevents interference between the free ends of the reeds during insertion. The resilient member deflects the reed toward the wall and away from the center of the tube to prevent engagement of the two axially inserted reeds.

---

The present invention relates to a new and improved apparatus for making electrical switches and, more particularly, to apparatus for making miniature electrical switches of the type including a dielectric housing in which a pair of magnetic switching elements or reeds are sealed, and constitutes an improvement on a copending patent application, Ser. No. 309,449, filed Sept. 17, 1963, now Patent No. 3,282,670.

Another object of the present invention is the provision of a new and improved apparatus for making sealed switches of the type including a dielectric housing and a pair of magnetic switch elements.

Another object of the present invention is to provide a new and improved apparatus for making sealed switches more ceonomically at an increased production rate.

Another object of the present invention is the provision of a new and improved apparatus for making sealed switches wherein the dielectric housings are drop fed into position between spaced-apart, relatively fixed heating elements for heat sealing opposite ends of the housings.

Another object of the present invention is the provision of a new and improved apparatus for feeding the switch elements to the chuck means of the apparatus wherein the switch elements are drop fed and magnetically held in position for pick up by the chuck means.

Another important object of the present invention is the provision of a new and improved apparatus for inserting the switch elements into the dielectric housing wherein one of the elements is biased to an off-center position during the insertion of the other to prevent the ends of the elements from touching one another.

Yet another object of the present invention is the provision of a new and improved apparatus for making sealed switches including new and improved heating elements for heat-sealing the ends of the dielectric housing around the switch elements.

Many other objects and advantages of the present invention will become apparent from consideration of the following detailed description in conjunction with the drawings, in which:

FIG. 3 is an enlarged plan view with portions in section, taken subsequently along line 4—4 of FIG. 2;

FIG. 6 is a sectional view taken substantially along line 6—6 of FIG. 2;

FIG. 7 is a fragmentary elevational view similar to FIG. 2 showing the tube feeding assembly in a different operative position;

FIG. 8 is a sectional view taken substantially along line 8—8 of FIG. 7;

FIG. 16 is an enlarged fragmentary plan view similar to FIG. 14 illustrating in phantom the operative positions of the lower reed chuck assembly;

FIG. 26 is an enlarged perspective view of the upper reed chuck assembly of FIG. 23;

Figure 1:
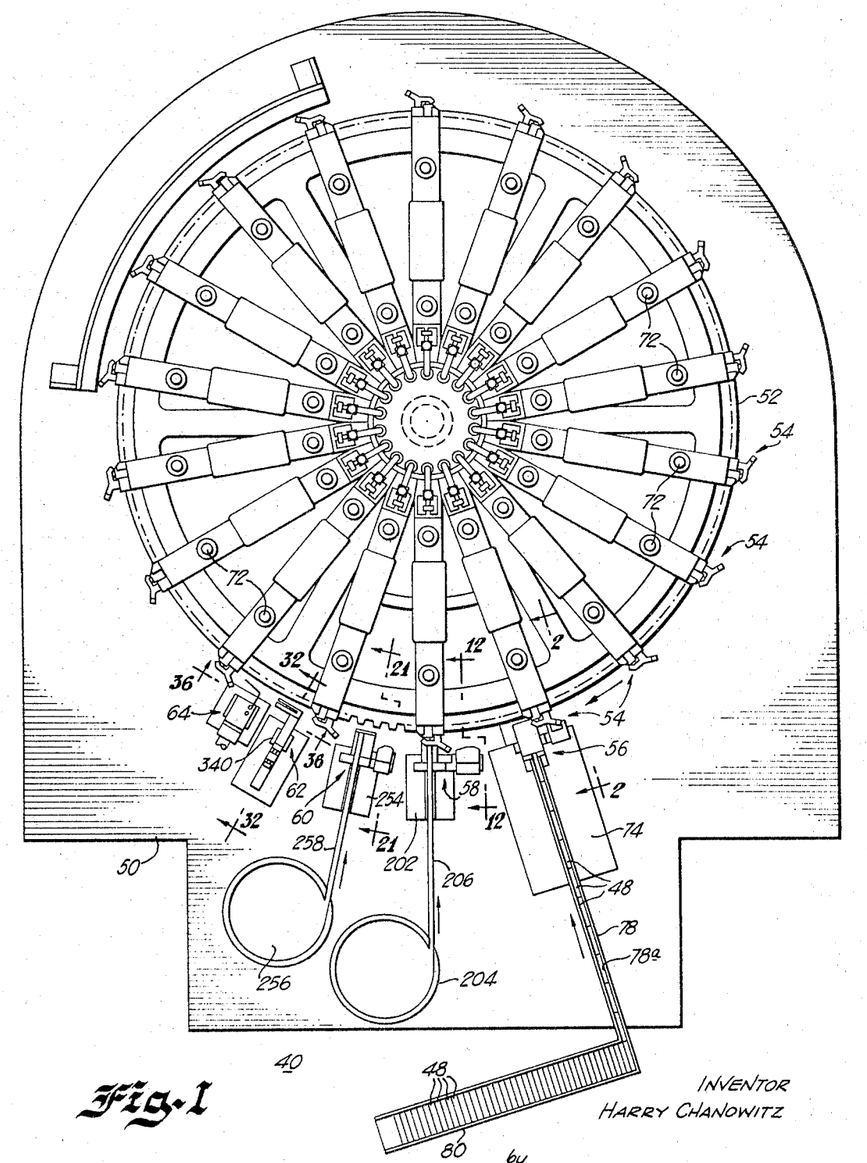
FIG. 1 is a top plan view of a new and improved apparatus for making sealed switches embodying the present invention.
Figures 32, 36, 38, 39:
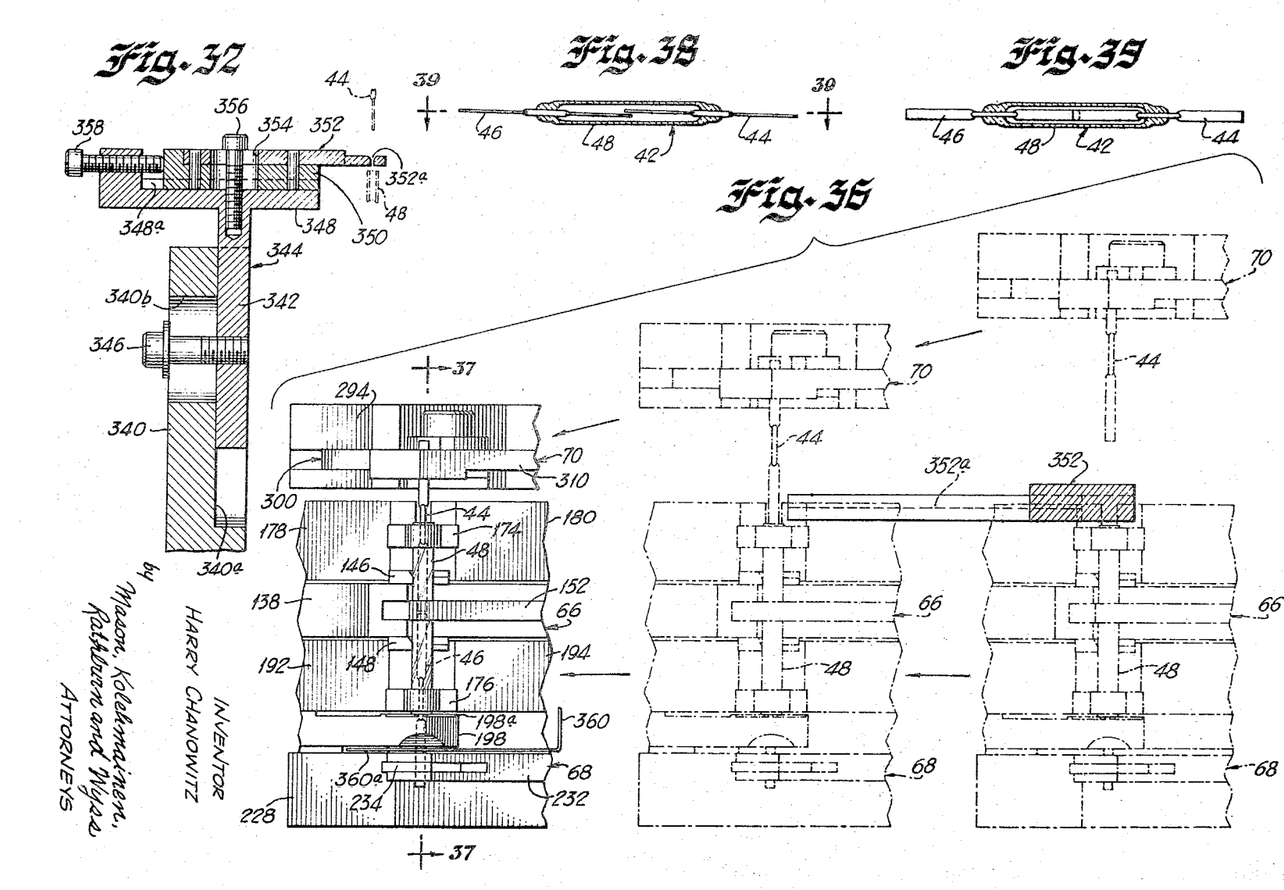
FIG. 32 is an elevational view in section taken substantially along line 32—32 of FIG. 1 of the upper reed insertion guide assembly of FIG. 31.
FIG. 36 is an elevational view of the head assembly of FIG. 35 taken substantially along line 36—36 of FIG. 1 illustrating in phantom the insertion of the upper reed into the glass tube.
FIG. 38 is a longitudinal sectional view of a completed sealed switch of the type manufactured by the apparatus of the present invention.
FIG. 39 is a sectional view taken substantially along line 39—39 of FIG. 38.

Referring now, more specifically, to FIG. 1 of the drawings, therein is illustrated a machine or apparatus 40 which embodies the present invention and which is adapted to automatically manufacture sealed magnetic switches 42, commonly termed reed switches (FIGS. 38 and 39). The switches 42 are formed with an upper magnetic switch element or reed 44 and a lower magnetic switch element or reed 46, which reeds are inserted into a dielectric housing or glass tube 48 with their inner ends in overlapping spaced relationship forming the contacts of the switch. The interior of the glass tube is filled with a gas to protect and extend the life of the contact surfaces of the reeds 44 and 46.

Figure 35:
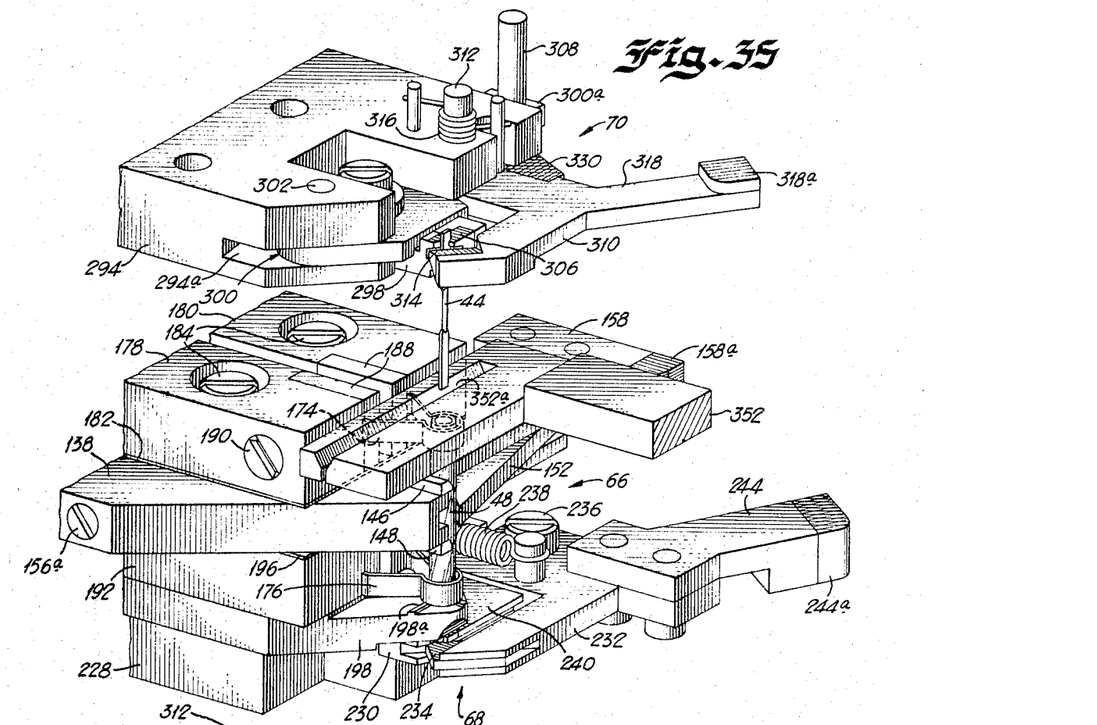
FIG. 35 is an enlarged perspective view of a complete head assembly illustrating the upper and lower reed chuck assemblies and tube chuck assembly prior to insertion of the upper reed into the tube.

The construction and arrangement of the switch-making machine 40 (FIG. 1) is of the same type generally as that disclosed and described in detail in the aforementioned copending application. Accordingly, only those portions of the machine 40 that relate to the present invention will be described in detail herein. In general, the machine 40 includes a main supporting structure or bed 50 mounted on the floor and suporting a table 52 for continuous rotation through 360 degrees of movement about a central axis. The table 52 carries a plurality of head assemblies (FIG. 35) 54 disposed at peripherally spaced positions relative to the central axis of the table. The bed 50 also supports an assembly 56 for feeding the glass tubes 48 to the rotating heads 54, an assembly 58 for feeding the lower reeds 46 to the heads, an assembly 60 for feeding the upper reeds 44 to the heads, an assembly 62 for guiding the upper reeds 44 during their insertion into the glass tubes 48, and an assembly 64 for biasing the lower reeds 46 away from the center of the tubes 48 during final insertion of the upper reeds 44. All of the assemblies 56, 58, 60, 62, and 64 are supported in fixed positions on the bed 50 and the assemblies 58, 60, and 62 are adapted to feed a glass tube 48, a lower reed 46, and an upper reed 44, respectively, in sequence to each of the heads 54 at it passes the respective feeding assembly during rotation of the table 52.

Figure 9:
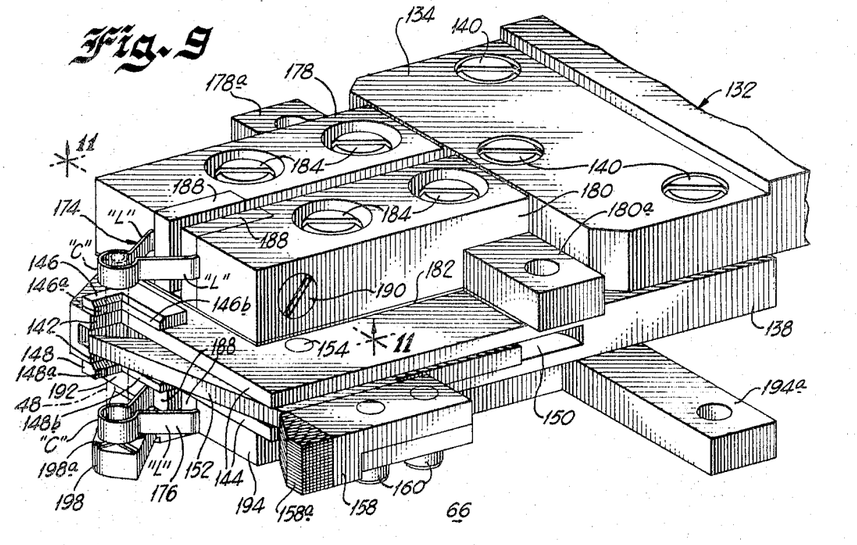
FIG. 9 is a perspective view of the glass tube chuck assembly of FIG. 2.
Figure 10:
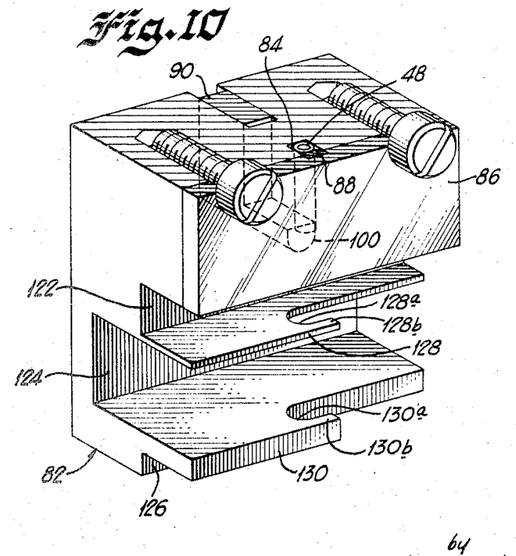
FIG. 10 is a perspective view of the glass tube feed guide assembly of FIG. 2.
Figure 11:
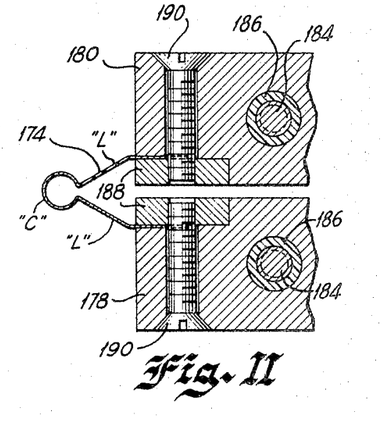
FIG. 11 is an enlarged sectional view taken substantially along line 11—11 of FIG. 9 illustrating one of the heating elements used for sealing the ends of the glass of a switch.

Each of the head assemblies (FIG. 35) 54 includes a glass tube-holding means or chuck assembly 66 (FIG. 9), a lower reed-holding means or chuck assembly 68 (FIG. 17), and an upper reed-holding means or chuck assembly 70. The upper reed chuck assembly 70 and the tube-holding chuck assembly 66 of each head assembly are mounted for vertical sliding movement relative to each other and to the lower reed chuck assembly 68 thereof on a common vertical guide rod 72 (FIGS. 1 and 2) carried on the table 52.

The upper two chuck assemblies of each head assembly are moved at selected time intervals during each rotative cycle of the table 52 by a cam track (not shown) which is carried in a fixed position on the bed 50 of the machine. The construction of the cam track can be of the general type disclosed in the aforementioned U.S. patent application and patents referred to therein, and FIG. 36 illustrates graphically the downward movement of the upper reed chuck assembly 70 as an upper reed 44 is inserted into the upper end of a tube 48 held by the tube chuck assembly 66.

Briefly, the vertical movements of the chuck assemblies 66 and 70 of each head assembly 54 during each rotation of the table 52 are as follows: As each head assembly 54 approaches the tube feed assembly 56, the chuck assemblies 66, 68, and 70 thereof are spaced vertically from one another and the head assembly is in a fully expanded position. As the head assembly moves past the fixed position of the tube feed assembly 56, an awaiting tube 48 is picked up by the tube chuck assembly 66, and the head assembly continues to move past the fixed position of the lower reed feed assembly 58 where an awaiting lower reed 46 is picked up by the lower reed chuck assembly 68. The head assembly continues in a fully expanded condition moving past the fixed position of the upper reed feed assembly 60 where an awaiting upper reed 44 is picked up by the upper reed chuck assembly 70. After an upper reed 44, a tube 48, and a lower reed 46 have been picked up, the upper chuck assembly 70 and tube chuck assembly 66 begin to move downwardly in unison toward the lower reed chuck assembly 68. As this occurs, the tube 48 held by the tube chuck assembly is moved downwardly over the upper end of the lower reed 46 held by the lower reed chuck assembly or, relatively speaking, the upper end of the lower reed is inserted into the tube. The tube chuck assembly 66 and lower reed chuck assembly 68 are then maintained in close vertical relation to one another or in contracted position, as shown in FIG. 36. The upper reed chuck assembly 70 then begins to move downwardly toward the tube chuck assembly 66, as shown in FIG. 36, until the upper reed is fully inserted into the tube held by the tube chuck assembly 66, and when insertion of the upper reed into the tube is complete, all three of the chuck assemblies 66, 68, and 70 are in close vertical proximity to each other and the entire head assembly 54 is then in a fully contracted position. The head assembly is maintained in the contracted position until near the end of a rotational cycle, when the upper reed chuck assembly 70 and the tube chuck assembly 66 move upwardly to an expanded position wherein the completed switch is removed from the upper reed chuck assembly prior to the beginning of another cycle.

Referring now, more particularly, to FIGS. 2 through 11, therein is illustrated the details of the tube feed assembly 56 together with a tube chuck assembly 66 of one of the head assemblies 54. As each of the head assemblies 54 moves around the circular path of travel about the central axis of the machine and passes by the tube feed assembly 56, a tube 48 is drop-fed from the feed assembly into the tube chuck assembly thereof. Timing of the drop-feeding operation is controlled by a microswitch (not shown) actuated by suitable camming devices on each of the moving head assemblies 54 as the chuck assemblies thereof move into receiving position (FIGS. 2, 3, and 4) to accept the tubes as they are fed from the feed assembly 56.

The tube feed assembly 56 includes an upstanding support structure 74 having a lower base fastened to the bed 50 of the machine and having an upstanding upper support bracket 76 on which the operative mechanisms of the feed assembly are mounted. Tubes 48 are supplied to the feed assembly 56 in end-to-end relation by means of a feed rail 78 having a longitudinal feeding way or slot 78a formed in the upper surface thereof. The forward end of the feed rail is supported by the support bracket 76 (FIG. 2) and the rearward end of the rail is connected to a magazine assembly 80 (FIG. 1) which supplies tubes to the feed rail in proper end-to-end orientation.

The feed assembly includes a main body member 82 supported on the bracket 76 and formed with a front face having an upper portion (FIG. 2) which curves rearwardly into alignment with the upper surface of the feed rail 78. The front face of the body member is formed with a vertically extending central feed slot 84 therein having an upper end curved rearwardly into alignment with the slot 78a in the feed rail to receive tubes therefrom. The lower portion of the feed slot is vertically aligned above the path of the moving tube chucks 66 in order that the tubes may drop downwardly from the slot into the chucks as they move into the tube receiving position. A curved Plexiglas window 86 is secured by cap screws to the front face of the body 82 and a portion of the upper surface of feed rail 78 in order to maintain the tubes 48 within the slots 78a and 84 on their downward travel from the feed rail to the vertical lower end portion of the feed slot 84. The rearward face of the vertical portion of the window 86 is provided with a vertical slotted portion 86a (FIGS. 6 and 8) which faces the slot 84 and accommodates a resilient cushion pad 88, the purpose of which will be discussed hereinafter.

Figures 4, 5, 7, 8:
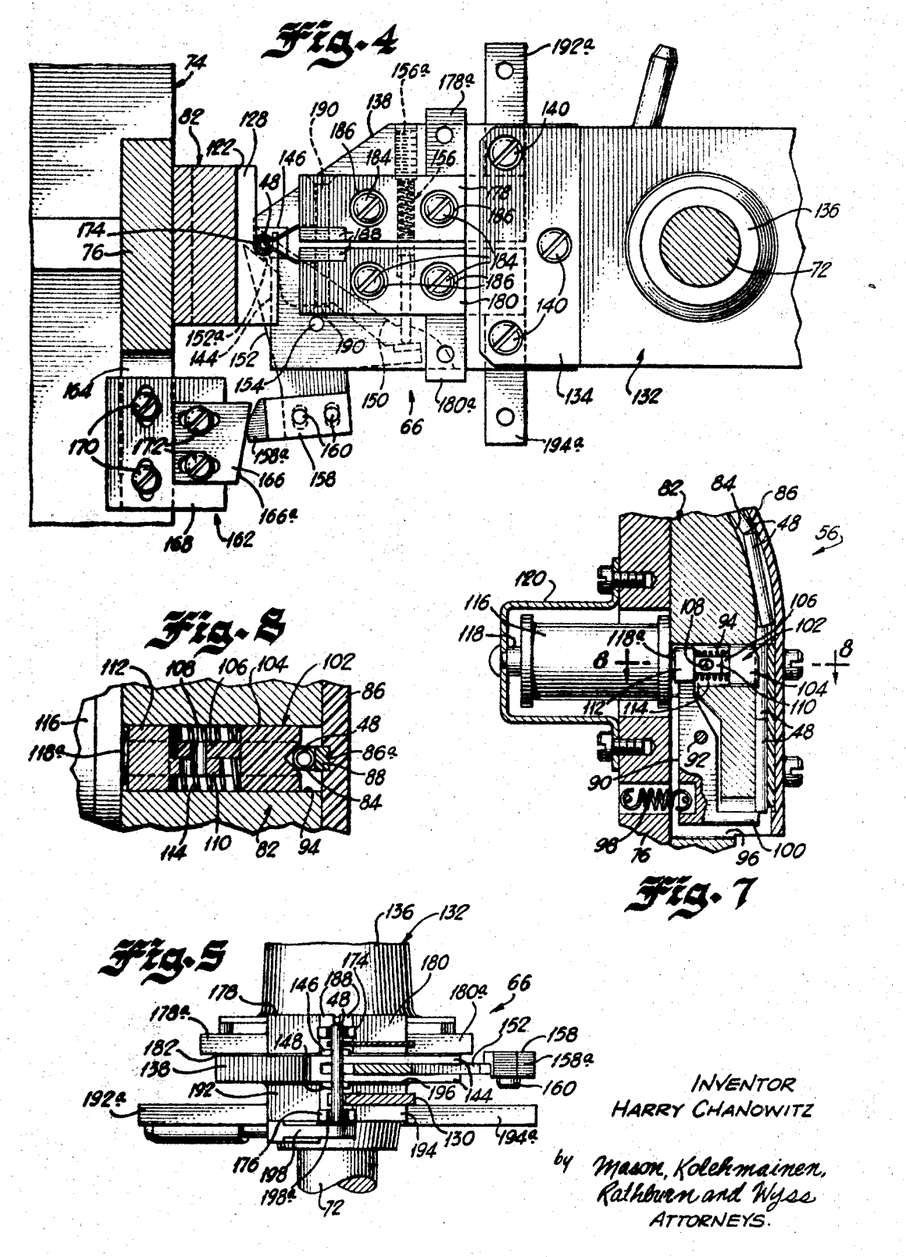

In order to control the drop-feeding of tubes 48 from the slot 84 into the moving tube chucks 66, the feed mechanism 56 includes a feed control lever 90 mounted on a pivot pin 92 for pivotal movement between a first position (FIG. 2) and a second position (FIG. 7). The lever 90 is disposed within an enlarged slotted-out portion in the rearward face of the main body 82 and the slotted-out portion includes an upper plunger slot 94 and a lower pawl slot 96, both of which slots extend forwardly to communicate with the vertical straight portion of the feed slot 84.

Figures 2, 3, 5:
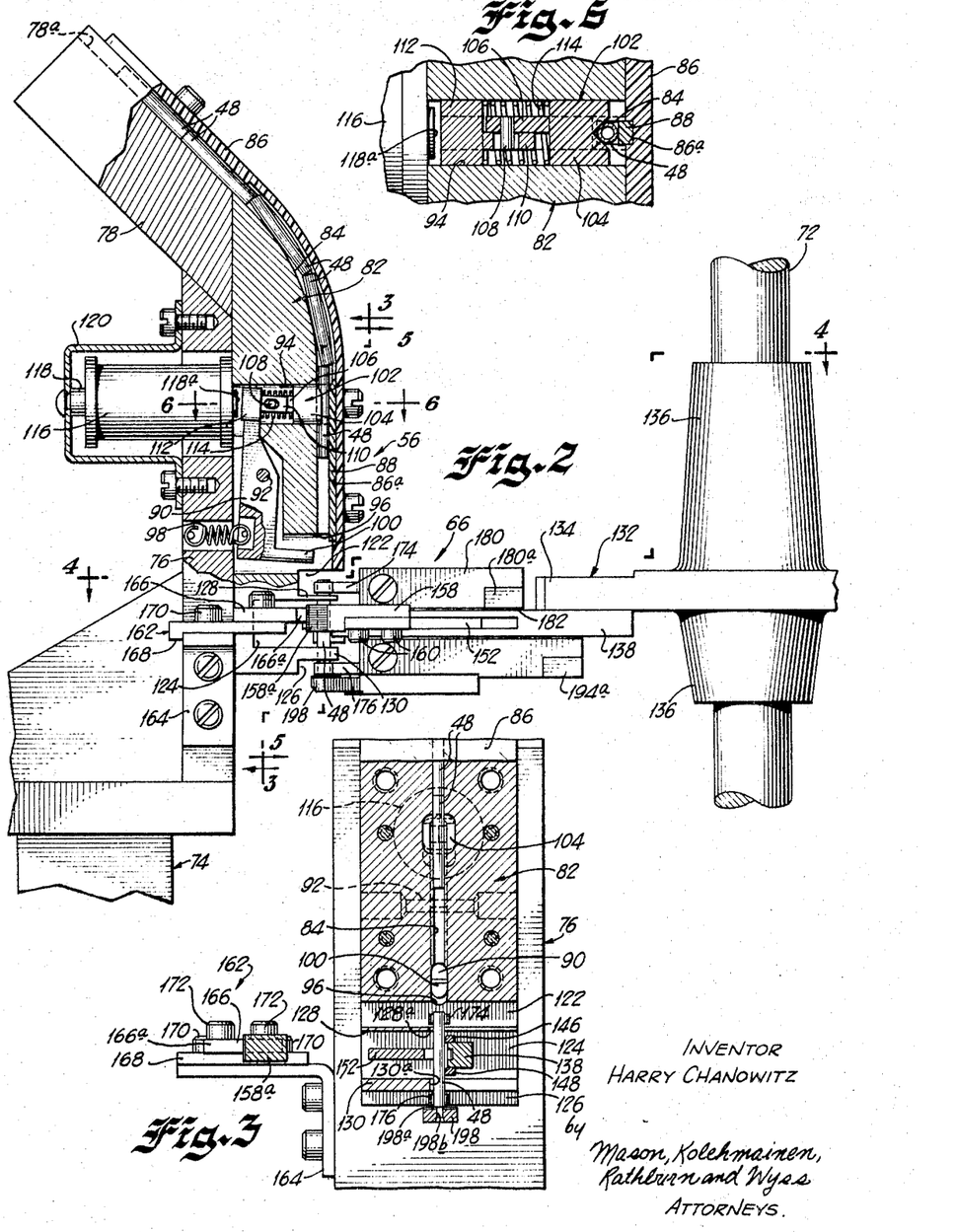
FIG. 2 is an enlarged elevational view, with portions in section, taken substantially along line 2—2 of FIG. 1 illustrating an assembly for feeding the dielectric housings or glass tubes to a chuck assembly for holding the tubes.
FIG. 3 is an elevational view taken substantially along line 3—3 of FIG. 2.
FIG. 5 is an elevational view taken substantially along line 5—5 of FIG. 2 looking in the opposite direction of FIG. 3.

The lower end of the feed control lever 90 is normally biased rearwardly to the first position (FIG. 2) by a spring 98, and the lever is provided with a forwardly extending lower pawl or finger 100 which moves within the slot 96 between the positions illustrated in FIGS. 2 and 7, respectively. When the lever 90 is in the position of FIG. 7, the forward tip of the pawl 100 projects forwardly into the feed slot 84 and prevents the tubes 48 from the feed slot from moving downwardly or drop-feeding. When the lever 90 is moved to the position of FIG. 2, the forward tip of the pawl 100 is retracted from the feed slot 84 and the lowest tube in the slot may then drop downwardly out of the slot or drop-feed into an awaiting tube chuck assembly 66.

In order to prevent more than one tube 48 from drop-feeding as the lever 90 moves from the position of FIG. 7 to that of FIG. 2, the upper end of the lever is connected to a plunger assembly 102 disposed for movement in the upper plunger slot 94. The plunger assembly includes a tube-engaging plunger 104 having a vertical V-slot in the front face thereof for engaging the tubes and pressing them against the cushion pad 88 when the lever is in the position shown in FIGS. 2 and 6. The plunger 104 is provided with a rearwardly extending tang 106 having a transverse pin 108 therein, which pin is slidable within a slot formed in a forwardly extending tang 110 formed on the upper end of the lever 90. The upper end of the lever is also provided with an enlarged magnetic armature 112, and a coil spring 114 is disposed between the armature and the rear face of the plunger 104 to resiliently bias the plunger forwardly away from the armature.

When the lever 90 is in the position of FIGS. 7 and 8, the pin 108 is at the forward end of the slot in the tang 110 and the plunger 104 is biased to its full forward position relative to the armature 112. When in this position, the V-slot in the front face of the plunger is spaced rearwardly from the tubes in the feed slot and, hence, the tubes can move freely past the plunger without interference until the lowest tube in the feed slot encounters the forward tip of the pawl 100 (FIG. 7). As the lever 90 is then moved to the position of FIG. 2, the plunger 104 moves forwardly to engage the adjacent or next to the lowest tube in the feed slot 84 (FIG. 6) and hold this tube positively against the cushion pad 88 to prevent it from dropping. The lowest tube in the slot is no longer held by the pawl and is drop-fed into an awaiting tube chuck. The cushion pad 88 and the spring 114 insure that the tubes 48 are not cracked or broken as the plunger 104 moves into engagement with them during movements of the lever 90.

In order to move the lever 90 from the position of FIG. 2 to that of FIG. 7 against the bias of the spring 98 and thereby cause the lowest tube in the feed slot 84 to drop into an awaiting tube chuck assembly 66 at the proper instant, the tube feed assembly 56 includes a solenoid coil 116 having an axial core 118 with a forward end 118a disposed in operative relation with the armature 112 on the upper end of the lever 90. The coil 116 is axially aligned with the plunger slot 94 in the body 82 and is supported by a cover member 120 which is fastened to the rear of the support bracket 76 with cap screws. When the coil 116 is energized, the armature 112 on the lever 90 is attracted to the forward end 118a of the core and the lever moves from the position of FIG. 2 to the position of FIG. 7. When the coil is then deenergized, the bias spring 98 acts on the lower end of the lever to move it from the position of FIG. 7 to that of FIG. 2 wherein it is maintained until the coil is again energized.

The coil 116 is normally energized and the lever 90 is thus normally in the position of FIG. 7 and the lowest tube in the feed slot is supported on the forward tip of the pawl 100 in a position ready for feeding. As each head assembly 54 moves and the tube chuck assembly 66 thereof comes into a tube-receiving position (FIGS. 2, 3, and 4), the coil 116 is momentarily deenergized, allowing the lever 90 to move to the position of FIG. 2 under the influence of the spring 98. As this occurs, the lowest tube in the feed slot 84 is released and drops downwardly into the tube chuck assembly, but the next to the lowest tube is held from dropping by the action of the plunger 104. The coil 116 is again energized and the lever 90 then moves back to the normal or original position, as shown in FIG. 7. When this occurs, the plunger 104 releases the tube held thereby and all of the tubes in the feed slot 84 then move downwardly therein until the lowest tube in the slot reaches the tip of the pawl 100. The feed cycle just described is then repeated as each successive tube chuck assembly 66 moves into the tube-receiving position beneath the feed slot 84 of the tube feed mechanism 56.

The lower portion of the main body member 82 is machined to form a plurality of horizontal spaced-apart slots (FIGS. 2, 3, and 10) in order to permit projecting portions of the tube chuck assembly 66 to pass directly beneath the feed slot 84. An upper slot 122 is provided to accommodate the movement of the upper heating element of the chuck assemblies, an enlarged central slot 124 accommodates the jaw members of the chuck assemblies, and a lower slot 126 accommodates the lower heating element of the chuck assemblies. Between the upper slot 122 and the central slot 124 a relatively thin portion of the body member 82 remains to form an upper tube guide member 128, and between the central slot and the lower slot 126 a relatively thicker portion of the member 82 forms a lower tube guide member 130. The tube guide members 128 and 130 are machined to form slots 128a and 130a therein, respectively, in which slots the tubes 48 are guided during the drop-feeding and pickup by the moving chuck assemblies. The slots 128a and 130a are wider than the diameter of the tubes 48 in order to allow some lateral movement of the tubes, and the slots are arranged generally tangentially of the path of movement of the head assemblies 54 and have open ends along the direction of movement thereof. Substantial portions of the guide members 128 and 130 which form the outer walls of the slots 128a and 130a, respectively, are removed (FIG. 10) leaving only relatively short outer wall portions 128b and 130b. The short portions permit the tubes 48 held by the chuck assemblies to move inwardly toward the center of the machine along the circular path without obstruction.

Each tube chuck assembly 66 includes a body member 132 having a horizontally extending jaw supporting portion 134 and an integral, vertically extending tubular portion 136 disposed for vertical sliding movement on the guide rod 72 to support the assembly. A fixed jaw member 138 is secured to the underside of the portion 134 of the body member by means of several cap screws 140. The fixed jaw member 138 is formed with a pair of surfaces 142 and 144 extending at right angles to one another with the surface 142 disposed in substantially radial alignment wtih respect to the center axis of the machine. The surfaces 142 and 144 define a tube receiving space or recess adjacent the outer portion of the jaw member 138 wherein the tubes are held in vertical position and extend upwardly and downwardly from the upper and lower surfaces of the jaw member.

A pair of L-shaped jaw elements 146 and 148 are disposed on the upper and lower surfaces, respectively, of the fixed jaw member 138 (FIG. 9) adjacent the intersection of the surfaces 142 and 144 thereof. The jaw elements are constructed of nonmagnetic carbide material and are beveled, as shown, to aid in guiding the tubes 48 into position as they are dropped into the chuck assembly. The jaw element 146 is formed with vertical tube-engaging surfaces 146a and 146b disposed at right angles to one another, and the jaw element 148 is provided with similar surfaces 148a and 148b. The surfaces 146a and 148a are positioned slightly outward of, and parallel to, the surface 142 of the fixed jaw member 138, and the surfaces 146b and 148b are likewise positioned slightly outward of, and parallel to, the surface 144 of the jaw member. Since the jaw elements 146 and 148 are constructed of hard carbide material, engagement with the glass tubes 48 will cause very little wear on the elements and should the wear reach excessive proportions the elements can be easily replaced.

The fixed jaw member 138 is formed with an enlarged horizontal slotted portion 150 (FIG. 9) in order to accommodate a movable jaw member 152 mounted for horizontal pivotal movement on a vertical pin 154. The movable jaw 152 is formed with a tube-gripping surface 152a which extends angularly to the gripping surfaces of the jaw elements 146 and 148 forming a sort of triangular-shaped pocket for holding the tubes. As shown in dotted lines in FIG. 4, the movable jaw 152 is biased to a tube-gripping or closed position by a spring and plunger assembly 156 mounted within a drilled passage in the fixed jaw member 138. The plunger assembly 156 includes an adjusting screw 156a (FIGS. 4 and 35) which can be tightened or loosened to provide for the proper gripping force exerted on the tubes by the surface 152a of the movable jaw 152.

In order to operate the movable jaw 152 between a tube-gripping closed position and an open position (FIG. 4) wherein the tube is not gripped, an actuator 158 is secured to the movable jaw by means of cap screws 160. The screws 160 extend through elongated slots (FIG. 4) provided in the movable jaw so that the position of the actuator on the jaw can be adjusted and, hence, exact timing for opening and closing of the chuck assembly can be controlled and adjusted. The actuator includes a hardened steel tip 158a for engaging a fixed actuating cam assembly 162 carried on an angle bracket 164 which is attached to the main support bracket 76 of the tube feed assembly. The cam assembly 162 includes a cam 166 having a slanted cam surface 166a which is engageable with the actuator tip 158a (FIG. 4) and a cam support member 168 which is attached to the angle bracket 164 with cap screws 170. The cam 166 is attached to the support member 168 with cap screws 172 and both the cam and the cam support member are provided with slots (FIG. 4) through which the respective cap screws 170 and 172 extend so that the position of the cam surface 166a can be adjusted both radially and tangentially relative to the circular path of the moving tube chuck assemblies to provide for opening and closing of the chuck jaws at the proper time. Referring to FIG. 4, as the chuck assembly 66 moves into the tube-receiving position, the actuator tip 158a engages the fixed cam surface 166a and causes the movable jaw 152 to open and remain open until the actuator tip moves past the cam surface. During this interval, a tube 48 is drop-fed into the chuck assembly from the tube feed assembly 56, as previously described. After the actuator tip 158a moves past the fixed cam surface 166a, the spring and plunger assembly 156 acts to bias the movable jaw 152 into a closed or tube-gripping position, wherein the tube is centered and held by the gripping surface 152a of the movable jaw against the surfaces 146a, 146b, and 148a and 148b of the L-shaped jaw elements 146 and 148.

In order to heat and seal the upper and lower ends of the tubes 48 around the upper and lower reeds 44 and 46 after insertion thereof, each tube chuck assembly 66 includes an upper heating element 174 and a lower heating element 176. The heating elements 174 and 176 are identical and are formed from flat strips of electrically resistive material, such as platinum-rhodium ribbon wire, which is capable of withstanding the high temperatures necessary. Each of the heating elements 174 and 176 includes a substantially circular heating portion C formed to concentrically encircle the tubes held in the chuck assembly (FIG. 9) and a pair of integral outwardly diverging, spaced-apart, support legs L.

The upper heating element 174 is electrically connected to and supported by a pair of spaced-apart terminal blocks 178 and 180, respectively. The terminal blocks are insulated from the upper surface of the fixed jaw member 138 by means of an insulating layer 182 and are secured to the jaw member by a plurality of bolts 184 having insulating sleeves 186 around them (FIG. 11) in order to prevent electrical contact between the terminal blocks and the fixed jaw member. The legs L of the upper heating element are clamped in place by clamping blocks 188 which are secured to the respective terminal blocks by means of bolts 190 (see FIG. 11). The terminal blocks 178 include a leg portion 178a having a hole therein adapted for connection to a source of electrical power and the terminal block 180 has a similar oppositely extending lug portion 180a. The lower element 176 is electrically connected to and supported by another pair of spaced-apart terminal blocks 192 and 194, respectively, which are secured to the underside of the fixed jaw element 138 in a manner similar to that of the upper terminal blocks 178 and 180. The lower terminal blocks are insulated from the lower surface of the fixed jaw element 138 by means of an insulating layer 196, similar to the insulating layer 182. The lower heating element 176 is secured to the lower terminal blocks 192 and 194 with clamping blocks and bolts similar to those used with the upper heating element, and lower terminal blocks are provided with oppositely outwardly extending lug portions 192a and 194a, respectively, having holes therein to facilitate connection of the terminal blocks to a suitable source of electrical power.

Directly below the lower heating element 176 there is provided a gas nozzle assembly 198 similar to that described in the aforementioned copending application. In addition to supplying gas, the nozzle assembly serves as a means for supporting the tubes 48 as they are drop-fed into position and before the tube is gripped by the movable jaw element 152 of the chuck assembly. The nozzle assembly is formed with a plurality of tube-supporting ridges 198a on the upper surface thereof extending radially outward from a centrally positioned gas orifice 198b (FIG. 3). Gas passes upwardly from the orifice into the tube held in the chuck assembly and the orifice also serves as a guide for the lower reeds 46 as they are inserted upwardly therethrough into the lower end of the tube.

As each chuck assembly 66 moves into a tube-receiving position directly beneath the feed slot 84 of the tube feed assembly 56, a tube 48 is dropped and falls downwardly through the circular portions C of the upper and lower heating elements 174 and 176, respectively. At this time, the movable jaw element 152 is in the open position and does not interfere with the downward movement of the tube through the circular portions C of the heating elements. In addition to their heating functions, the circular portions C serve as guiding means for the tubes during their downward movement and, additionally, serve as means for loosely holding the tubes until they are centered and gripped by the jaw elements of the chuck assembly. The gas nozzle assembly 198 maintains each tube in proper vertical position in the chuck assembly until the movable jaw 152 of the chuck assembly closes to center and positively holds the tube in assembly position.

Because the tubes 48 are drop-fed by gravity and fall downwardly through the circular portions C of the tube heating elements 174 and 176, it is not necessary that these elements be movable relative to the jaw members of the chuck assembly. This is a distinct improvement over previous side feeding mechanisms which required movable heating elements and, consequently, a larger number of moving parts, cam assemblies, and other mechanisms.

Referring now to FIGS. 12 through 20, therein is illustrated in detail the lower reed feed assembly 58 and one of the lower reed chuck assemblies 68 in operative relation to each other. The lower reed feed assembly 58 includes an upstanding support bracket 200 carried on a base 202 which is fastened to the bed 50 of the machine. The lower reeds 46 are supplied from a reed magazine 204 which arranges the reeds in end-to-end relation and feeds them along a feed rail 206 to the feed assembly 58. The forward end of the feed rail 206 curves downwardly into vertical alignment with a feed slot 208 formed in an upper guide member 210 of the feed assembly 58.

Figure 18:
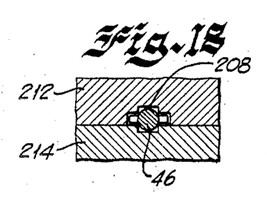
FIG. 18 is a sectional view taken substantially along line 18—18 of FIG. 15.

Referring momentarily to FIGS. 38 and 39, both the upper reed 44 and lower reed 46 have flatted portions at their ends and a cylindrical portion in the center. The feed slot 208 is formed with a cross section, as shown in FIG. 18, in order to orientate the flatted end portions of the reeds 46 in proper tangentially parallel relation to the circular path of the moving head assemblies 54 as the reeds move downwardly in the slot and the upper end of the feed slot 208 is enlarged, as at 208a, to aid in guiding the reeds into the feed slot from the feed rail 206.

Figures 12, 13, 14, 15:
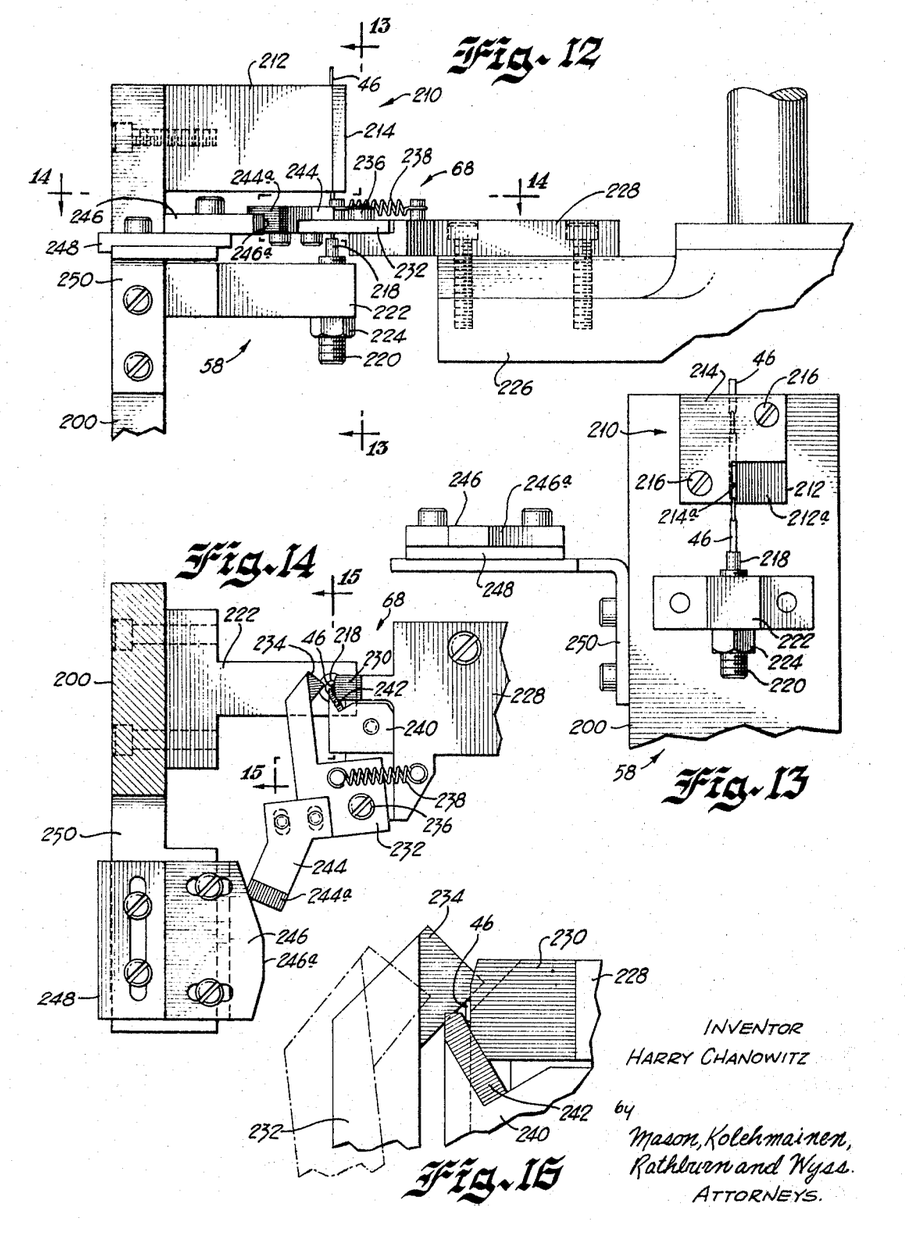
FIG. 12 is an elevational view taken substantially along line 12—12 of FIG. 1 illustrating an assembly for feeding the lower switch elements or reeds into a chuck assembly for holding the reeds.
FIG. 13 is an elevational view taken substantially along line 13—13 of FIG. 12.
FIG. 14 is a plan view taken substantially along line 14—14 of FIG. 12.
FIG. 15 is an enlarged elevational view similar to FIG. 13 taken substantially along line 15—15 of FIG. 14.
Figure 15:
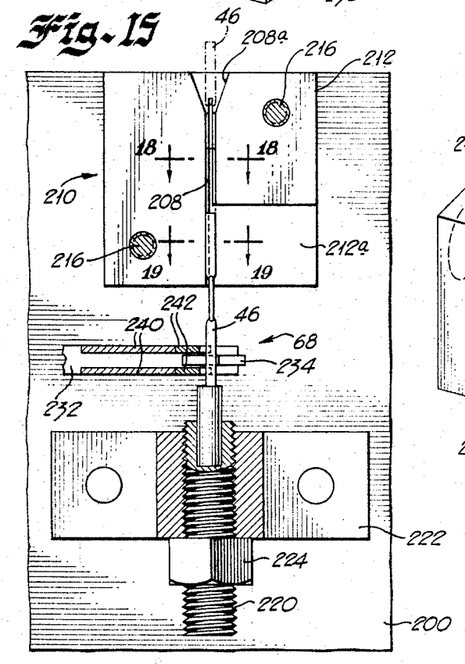
Figure 19:
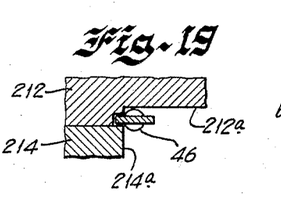
FIG. 19 is a sectional view taken substantially along line 19—19 of FIG. 15.
Figure 20:
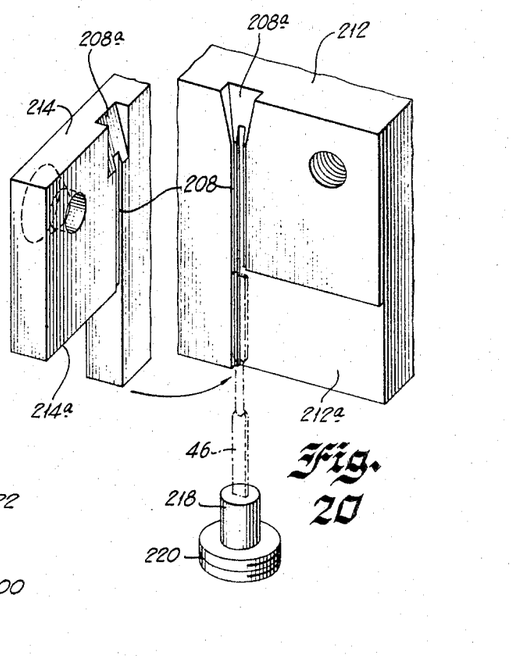
FIG. 20 is a perspective view of the lower reed guide assembly of FIG. 15 illustrated in an open position for clarity.

The upper guide member 210 includes a main body 212 secured to the upstanding support bracket 200 and a removable head 214 secured to the forward face of the body by means of cap screws 216. As can be seen from FIGS. 18, 19, and 20, both the main body 212 and the head 214 are vertically slotted in order to form the feed slot 208 with the cross section as shown. As the reeds 46 drop downwardly through the feed slot 208, they are orientated into proper relation about their longitudinal axis relative to the machine because of the shape of the cross section of the slot, and the flatted end portions of the reeds are aligned, as shown in FIG. 14, generally tangential to the circular path of the moving head assemblies 54 of the machine. The cross section of the feed slot 208 is somewhat larger than that of the reed 46 to permit the reed to move freely downward through the slot, once it has been properly orientated relative to the machine. A section 212a adjacent the lower right-hand corner of the main body 212 (as viewed in FIGS. 15 and 20) is milled out to provide a side opening in the lower portion of the feed slot to permit the reeds 46 to move horizontally out of the guide member 210 as they are picked up by the moving chuck assemblies 68 and a matching lower right-hand corner section 214a of the head 214 is removed, as shown in FIGS. 15, 19, and 20. After the reeds 46 move downwardly through the feed slot 208, the lower ends thereof contact a magnetic anvil 218 which is positioned vertically below the feed slot. The anvil 218 is carried on a threaded rod 220 which is supported in a lower base member 222. The base member 222 is attached to the upstanding support bracket 200 and the upper surface thereof is spaced below the lower surface of the upper guide member 210 in order that the lower reed chuck assemblies 68 may move between the two members to pick up the reeds. The height of the anvil 218 is adjustable by turning the threaded rod 220 and a locknut 224 is provided to secure the rod in proper vertical position, once adjusted. The upper guide member 210, the support bracket 200, the lower base member 222, and threaded rod 220 are constructed of magnetizable material, such as steel, so that when the lower end of reed 46 touches the upper surface of the anvil 218, the upper end of the reed will be magnetically attracted to the face of the section 212a on the upper guide member. Hence, the magnetic anvil 218 holds the lower end of the reed in place and the reed is maintained in upstanding position by the attraction between the upper end of the reed and the face of section 212a. The reeds 46 are maintained in an upstanding position by magnetic forces until they are picked up by the moving chuck assemblies. As each reed is picked up another reed moves downwardly into pickup position. The reeds are arranged in vertical end-to-end position and drop by gravity as the lowest reed is removed by the passing chuck assembly.

Figure 17:
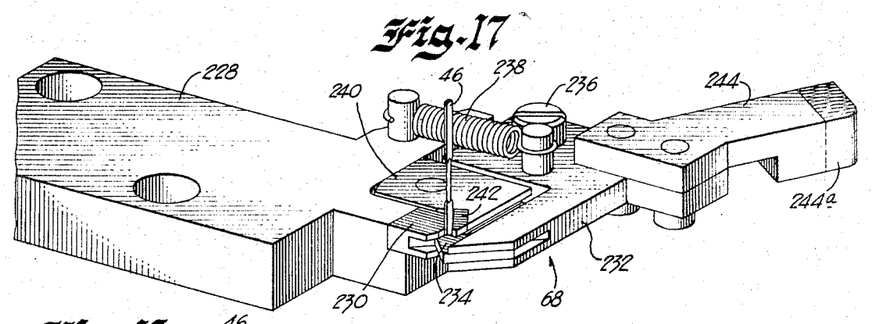
FIG. 17 is an enlarged perspective view of the lower reed chuck assembly of FIG. 14.

The lower reed chuck assembly 68 includes a main support member 226 which carries a fixed jaw member 228. The jaw member 228 includes an outwardly extending tip section 230 which is constructed of nonmagnetic carbide material and is horizontally slotted to accommodate opening and closing movement of a movable jaw member 232. The movable jaw member 232 is also provided with a nonmagnetic carbide tip portion 234 and is pivotally mounted on the fixed jaw member 228 by a pin 236, and the movable jaw is biased toward a reed-gripping or closed position (as shown in solid lines of FIG. 16) by means of a spring assembly 238. The chuck assembly includes a third jaw member 240 having a non-magnetic carbide tip 242 arranged with a gripping surface disposed in angular relation to the outer gripping surface of the tip 230 on the fixed jaw member 228. As each chuck assembly moves past the feed assembly 58 and picks up a reed magnetically held in upstanding position, the lower flatted end portion of the reed is first engaged by the tip portions 230 and 242, as shown in FIG. 14. During the first engagement between the chuck assembly and the upstanding reed, the movable jaw 232 is in an open position and the tip 234 thereof does not touch the reed. The movable jaw then closes at a slightly later time and the tip 234 engages the reed, as shown in FIG. 16, and the lower end of the reed is positively held by the chuck assembly with the reed in upstanding position, as shown in FIG. 17. The movable jaw 232 includes an actuator 244 engageable with a fixed cam 246 which is supported by the support bracket 200. The movable jaw is slotted, as shown in FIG. 14, and the actuator is secured to the jaw with cap screws extending through the slots so that the position of the actuator on the movable jaw can be adjusted. The actuator is provided with a carbide tip 244a to prevent excessive wear, and as wear occurs the position of the actuator can be adjusted to compensate therefor. The cam 246 has an outer cam face 246a shaped, as shown in FIG. 14, to first open the chuck assembly, allow the chuck to remain open, and then allow the chuck to close. The cam is secured to a support member 248 by cap screws which extend through slots provided in the cam in order to permit adjustment of the position of the cam toward or away from the center of the machine. The support member 248 is bolted onto an angle bracket 250 which is secured to the upstanding support bracket 200, and the support member is slotted in order to provide for lateral adjustment of the cam position. From the foregoing, it can be seen that the magnetic anvil 218 and its associated upper guide member 210 provide means for magnetically maintaining the reeds in upstanding position in preparation for pickup by the moving chuck assemblies which grasp the reeds at the lower flatted ends thereof. The use of magnetic forces for positioning and holding the reeds in an upstanding position prior to pickup by the chucks is extremely advantageous in that it provides positive holding of the reeds and yet allows them to be picked up readily without damage or bending thereof. The apparatus of the invention has greatly reduced the rejects caused by bending of the reeds, a common difficulty in prior conventional mechanical reed feeding mechanisms.

Referring now more specifically to FIGS. 21 through 30, therein is illustrated in detail the upper reed feed assembly 60 and one of the upper reed chuck assemblies 70 with the two assemblies illustrated in operative relation with each other. The upper reed feed assembly 60 includes an upstanding support bracket 252 carried on a base 254 which is fastened to the bed 50 of the machine. Upper reeds 44 are supplied to the feed assembly 60 from a magazine 256 (FIG. 1) which arranges the reeds in end-to-end relation and feeds them along a feed rail 258 having its forward end connected to the feed assembly. The forward end of the feed rail curves downwardly in order to direct the reeds 44 vertically downward into the feed assembly 60.

Figures 21, 22, 23, 25:
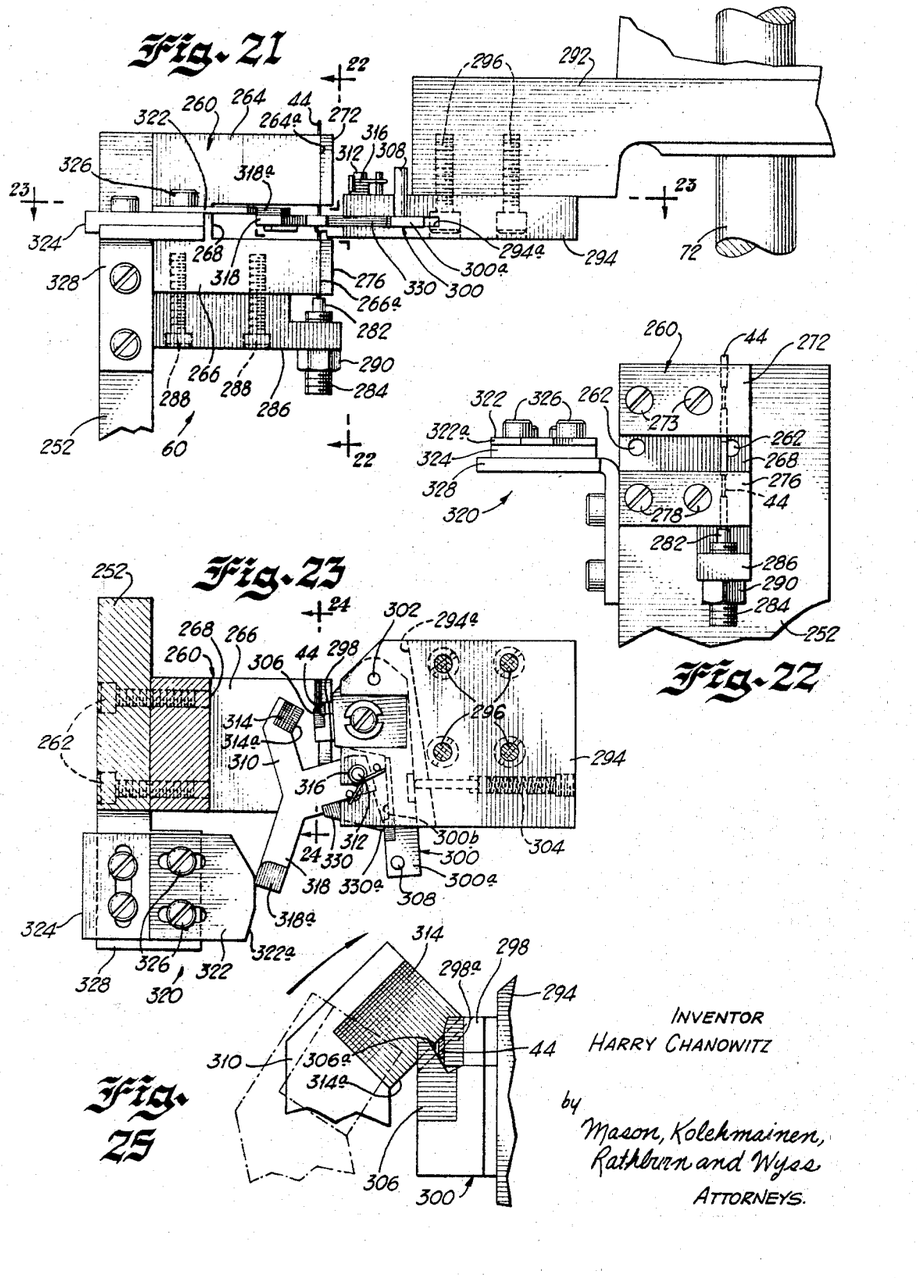
FIG. 21 is an elevational view taken substantially along line 21—21 of FIG. 1 illustrating an assembly for feeding the upper switch elements or reeds into a chuck assembly for holding the reeds.
FIG. 22 is an elevational view taken substantially along line 22—22 of FIG. 21.
FIG. 23 is a plan view with portions in section taken substantially along line 23—23 of FIG. 21.
FIG. 25 is an enlarged fragmentary plan view similar to FIG. 23 illustrating in phantom the operative positions of the upper reed chuck assembly.
Figure 24:
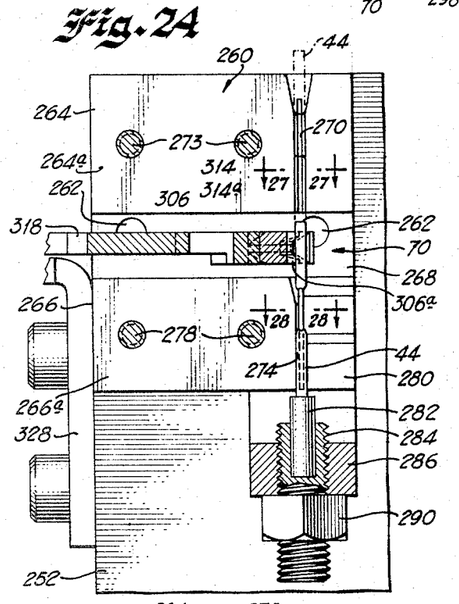
FIG. 24 is an elevational view taken substantially along line 24—24 of FIG. 23.
Figure 25:
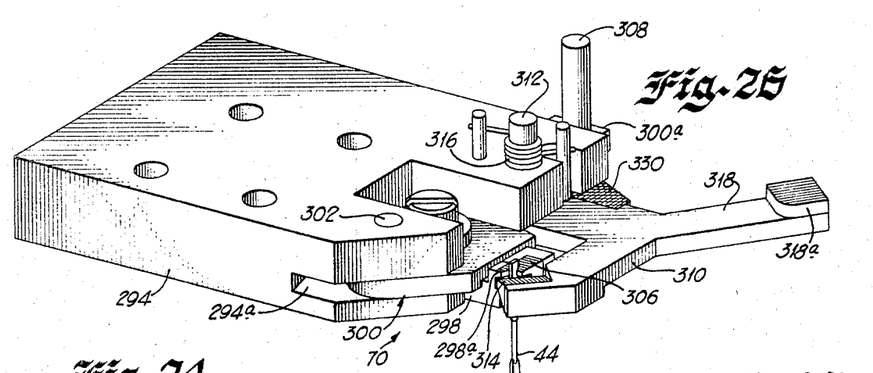
Figure 27:
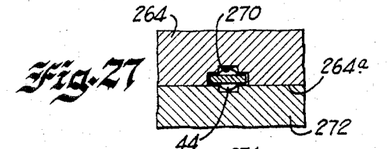
FIG. 27 is a sectional view taken substantially along line 27—27 of FIG. 24.
Figure 29:
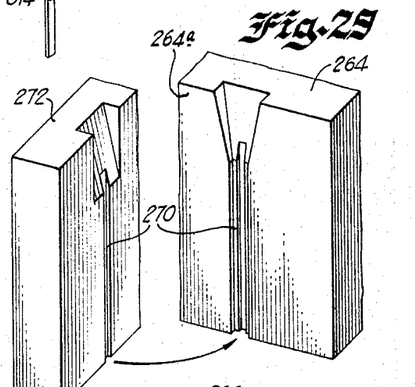
FIG. 29 is a perspective view of the upper portion of the upper reed guide assembly of FIG. 24 illustrated in an open position for clarity.

The feed assembly includes a C-shaped guide member 260 (FIG. 21) which is bolted onto the support bracket 252 with cap screws 262 (FIG. 23). The guide member 260 includes an upper guide 264 and a lower guide 266 separated from one another by a horizontally disposed slotted-out portion 268. The slotted-out portion is provided in order to accommodate the moving chuck assemblies 70 and permit them to move between the upper and lower guides. The upper guide 264 is formed with an outer face 264a having wall portions of an upper vertical, reed feeding slot 270 defined therein. The slot guides the reeds downwardly into a feeding position wherein they are grasped or picked up by the moving chuck assemblies. As can be seen from FIG. 27, the feed slot 270 is similar in cross section to that of the feed slot 208 of the lower reed feed assembly 58 and performs a similar function in orientating the end portions of the reeds into proper tangential alignment with respect to the central axis of the machine as the reeds move through the slot. Opposite wall portions of the feed slot 270 are defined in an upper head or cap 272 which is removably secured to the face 264a of the upper guide 264 by cap screws 273. The upper portion of the feed slot 270 is tapered, as shown in FIGS. 24 and 29, to aid in guiding the reeds into the slot from the feed rail 258.

Figure 28:
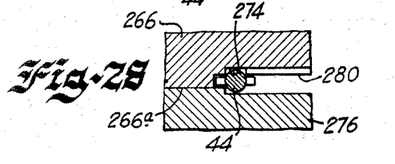
FIG. 28 is a sectional view taken substantially along line 28—28 of FIG. 24.
Figure 30:
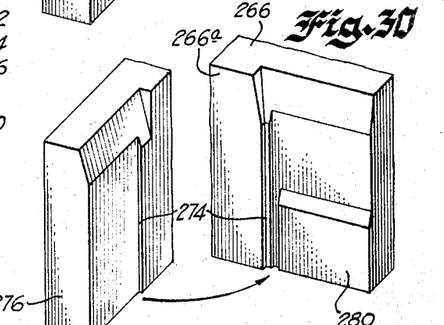
FIG. 30 is a perspective view of the lower portion of the upper reed guide assembly of FIG. 24 illustrated in an open position for clarity.

The lower guide 266 is somewhat similar to the upper guide 264 and includes an outer face 266a having wall portions of a lower vertical, reed feeding slot 274 formed therein. A lower cap or head 276 is secured to the outer face 266a of the lower guide by cap screws 278, and the lower head forms opposite wall portions of the slot 274. The slots 270 and 274 are in vertical alignment with one another so that reeds passing downwardly through the upper slot 270 will be directly in line with the lower slot 274. Upper portions of the face 266a and cap 276 are tapered as shown in FIGS. 24 and 30 in order to guide the reeds downwardly into the lower feed slot 274. Referring to FIG. 28, portions of the lower guide 266 and head 276 adjacent the right-hand edge of the slot 274 are removed or milled out in order to permit the reeds 44 to be withdrawn from the feed slot in a horizontal direction by the moving chuck assemblies 70. FIG. 30 shows in detail the removed or milled out portions of the guide 266 and head 276, but a lower land portion 280 adjacent the lower right-hand corner on the front face 266a of the lower guide 266 is not milled away so that the lower flatted ends of the reeds 44 will be maintained in the proper tangential relationship to the central axis of the machine as the reeds are moved horizontally out of the lower slot 274 by the moving chuck assemblies.

The reeds 44 are supported in an upstanding feeding position in the lower feed slot 274 on a magnetic anvil 282 positioned directly below the slot. The anvil 282 is seated on a threaded rod 284 adjustable in a vertical direction relative to a support member 286 bolted to the lower guide 266 with cap screws 288. The anvil 282 can be raised or lowered to properly position the reeds 44 so that the moving chucks 70 will grasp the upper flatted end portions at the proper level, and after the anvil has been properly adjusted for height, it may be locked in place by tightening a locknut 290 against the underside of the support member 286. As the lower end of each reed 44 touches the anvil 282, the reed becomes magnetized and the central portion thereof is attracted to the adjacent portions of the lower guide 266 or head 276. The guide 266, head 276, threaded rod 284, and support member 286 are all constructed of magnetizable material, such as steel, so that a magnetic circuit will be completed from the guide through the reed to the anvil and thus the reeds are magnetically held in upstanding position on the anvil until picked up by a moving chuck assembly. As each reed is picked up by a moving chuck assembly 70, another reed immediately thereabove falls vertically downward into feeding position awaiting pickup by the next chuck assembly.

The upper reed chuck assemblies 70 are somewhat similar to the lower reed chuck assemblies 68, and each includes a horizontally disposed main support member 292 mounted for vertical sliding movement on a respective vertical guide rod 72. The chuck assemblies 70 are different from the chuck assemblies 68 in that the former are designed so that they may be cocked or held in the open position until they are tripped by a cam operator to move to the closed or reed-gripping position.

The chuck assemblies 70 are provided with a body portion 294 secured to the underside of the support member 292 by bolts 296. The portion 294 is formed with an outwardly extending jaw element 298 having a nonmagnetic carbide tip 298a thereon for bearing against one of the flatted surfaces on the upper end of a reed 44, as shown in FIG. 25. The assembly includes a first movable jaw member 300 pivotally mounted on a pin 302 and biased in a clockwise direction thereabout by a spring bias assembly 304 (FIG. 23). The jaw member 300 is sandwiched within a horizontal, slotted-out portion 294a of the body 294 and is formed with a jaw member 306 of nonmagnetic carbide material (FIG. 25) having an angularly disposed gripping surface 306a for engaging a corner of the reeds 44 and biasing them against the gripping surface of the jaw tip 298a. The member 300 includes an elongated arm 300a extending outwardly of the body 294 (FIG. 23) and having an upstanding actuating pin 308 adjacent the outer end thereof. The arm 300a is biased in a clockwise direction about the pin 302 by the spring assembly 304 (FIG. 23) so that normally the gripping surface 306a will bias or grip the reeds and hold them tightly against the tip 298a. The forward edge of the arm 300a is formed with a recess 300b therein (FIG. 23) which recess serves as a latch means for holding the chuck assembly in an open position.

The chuck assemblies 70 also include a second movable jaw member 310 pivotally mounted on a pin 312 carried by the body 294. The jaw member 310 includes a nonmagnetic carbide tip element 314 having a reed-gripping surface 314a (FIG. 25) normally disposed angularly to the other reed-gripping surfaces of the chuck assembly and biased to bear against one corner of the flatted end portion of the reeds 44 and hold the reeds tightly against the other reed-gripping surfaces when the chuck assembly is closed. The jaw member 310 is biased in a clockwise direction about the pin 312 (FIG. 23) by a coil spring 316 so that the surface 314a is normally urged to a reed-holding or closed position.

In order that the chuck assemblies 70 may be opened to pick up the reeds 44, the jaw members 310 include actuating arms 318 having carbide tips 318a adapted to be engaged by fixed cam operators, such as a cam assembly 320 (FIGS. 22 and 23) on the upper reed feed assembly 60. The cam assembly 320 includes a hardened steel cam element 322 having a contoured cam surface 322a adapted to engage the tips 318a of the chuck assemblies 70 as they move by. The cam 322 is slotted, as shown in FIG. 23, so that the position of the cam may be adapted to provide for exact timing of opening and closing of the chuck assemblies. The cam 322 is secured to a cam support 324 by cap screws 326, and the cam support is in turn secured to an angle bracket 328 bolted to the support bracket 252. The support 324 is slotted and is slidable along the horizontal arm of the angle bracket to provide for further adjustment of the timing of chuck opening.

The jaw member 310 includes a somewhat triangularly shaped segment 330 of carbide material (FIGS. 23 and 26) having a rearward corner 330a which is engageable against the end of the recess 300b in the jaw member 300 when the chuck mechanism is moved or cocked in the fully opened position. Cocking of the chuck assembly is accomplished by camming the actuator tip 318a to move the jaw member 310 far enough in a counterclockwise direction until the corner 330a thereof can slide into the recess 300b of the jaw member 300 and bear against the end of the recess. When this occurs, the jaw members 310 and 300 are interlocked together in the open position and the tips 314 and 306 thereof, respectively, are out of reed-gripping relation with the fixed jaw tip 298 and with one another. As the moving chuck assemblies 70 approach the upper reed feed assembly 60, the actuator tips 318a engage the fixed cam surface 322a and pivot the jaw members 310 in a counterclockwise direction (FIG. 23) to move the corner 330a into latching engagement at the end of the recess 300b. The jaw members 310 are then maintained in the cocked position by the engagement of the corner 330a against the end of the recess 300b and as the chuck assembly continues to move toward the feed assembly 60, the fixed cam 322 permits the interlocked jaw members 310 and 300 to pivot in a clockwise direction so that the tip 314 moves to grip the reed. As this occurs, the pin 308 is engaged by a fixed cam member (not shown) which prevents the member 300 from further clockwise movement and trips the mechanism to disengage the tip 330a from the end of the recess 300b so that the jaw member 310 may fully close to grip an upper reed. The chuck assemblies 70 are maintained in the open or cocked open position from a time during the latter part of an operating cycle when the switches are released after their completion until a new reed 44 is picked up. The chuck assembly is released from the cocked open position in the manner described by camming action on actuating pin 308, moving it inwardly toward the central axis of the machine until the end of the recess 300b moves out of engagement with the corner 330a.

Figure 37:
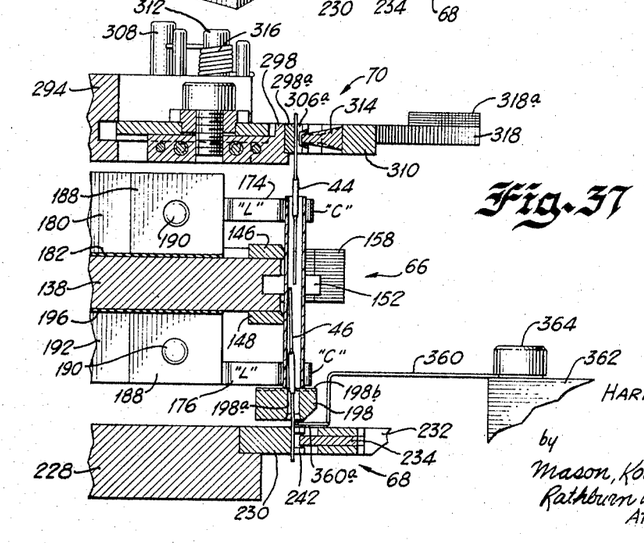
FIG. 37 is an elevational view in section taken substantially along line 37—37 of FIG. 36 illustrating the lower reed as it is moved by the biasing assembly during insertion of the upper reed into the tube.

After each head assembly 54 moves past the tube feed assembly 56 and the reed feed assemblies 58 and 60, the tube chuck assembly 66 and upper reed chuck assembly 70 begin to move in unison vertically downwardly toward the lower reed chuck assembly 68. As this occurs, relatively speaking, the upper end of the lower reed 46 is inserted upwardly through the opening 198b in the gas nozzle assembly 198 and into the tube 48. Referring to FIG. 37, the lower portion of the opening 198b is flared or beveled in order to aid in guiding the upper end of the reed into the tube, and it can be seen from this figure, along with FIGS. 35 and 36, that the tube chuck assembly 66 and lower reed chuck assembly 68 are in close vertical relation to one another after insertion of the lower reed 46 into the tube 48 has been completed.

After the lower reed is inserted into the tube, as just described, the upper reed chuck assembly 70 begins to move downwardly with respect to the tube chuck assembly 66, as illustrated graphically in FIG. 36, in order to insert the upper reed 44 into the tube. In order to accurately guide the lower end of the upper reed 44 into the upper end of the tube 48 during insertion, the previously mentioned upper reed insertion guide assembly 62 is provided. The guide assembly 62 includes an upstanding fixed support bracket 340 which is mounted on the bed 50. The upper end of the bracket 340 is provided with a vertical slot 340a which slidably receives a depending leg 342 of a T-shaped cradle member 344. The leg of the cradle member can be adjusted vertically in the slot 340a and is held in place by a cap screw 346 which is threaded into the leg and which extends through a vertical slot 340b in the rear face of the support bracket.

The T-shaped cradle 344 includes a horizontally extending portion 348 having a track or way 348a formed thereon to slidably receive a bed piece 350 which carries an L-shaped reed guide 352. The reed guide 352 and bed piece 350 are slotted as at 354 to permit horizontal sliding adjustment of these members on the way 348a, and a cap screw 356 extends downwardly through the slot 354 and is threaded into the upper end of the leg 342 to secure the reed guide on the cradle. Horizontal sliding movement of the bed piece 350 and reed guide 352 is obtained by means of a horizontal adjusting bolt 358 which is threaded into a short upstanding end portion of the horizontal leg 348 of the cradle.

The reed guide 352 is formed with an open-ended reed guiding slot 352a positioned to lie generally tangential to the circular path of movement of the upper reeds. As can be seen from FIGS. 32 and 36, the guide 352 is positioned just above the upper end of the tubes 48 and serves to guide the lower flatted ends of the upper reeds into the tube as the upper reed chucks 70 move downward. The upper surface of the reed guide 352 adjacent the slot 352a is beveled to aid in guiding the lower ends of the reeds into the slot and the slot is constructed to be somewhat wider than the thickness of the flatted ends of the reeds to allow a little lateral play. Because of this lateral play and because of the relatively large diameter of the circular path of movement of the reeds, it is not necessary that the slot 352a be curved and, hence, the slot can be milled out along a line with a simple milling machine. It should also be noted from FIG. 36 that the guide slot 352a is only long enough to guide the upper reed prior to initial insertion and for a short period thereafter and by this time the head assembly moves on past the guide assembly.

When the upper reed 44 and lower reed 46 are fully inserted in the tube 48, the ends of the reeds are in overlapping spaced-apart position, as shown in FIG. 38, to form the switch contacts of the completed switch assembly 42. Since the lower reed 46 is fully inserted into the tube before insertion of the upper reed 44 is completed, it is more difficult to insert the latter since the area available within the tube is somewhat lessened because of the presence of the lower reed and because of the possibility of the ends of the reeds striking one another during insertion.

In order to eliminate or greatly reduce the possibility of the upper reed striking the lower reed during insertion of the former and thereby causing the reeds to bend, the lower reed is momentarily cammed away from the center of the tube during the latter or final stages of the insertion, as illustrated in FIG. 37. Camming of the lower reed is accomplished by a resilient wire finger 360 which engages the reed just above the jaws of the lower reed chuck assembly 68. With the lower reed 46 cammed away from the center axis of the tube 48, as shown in FIG. 37, the full insertion of the upper reed 44 can be accomplished with little danger of the reeds striking each other. Since the reeds are very small in miniature switches, they are fragile and easily bent, and the present invention has virtually eliminated the problems of bent reeds that were heretofore encountered.

Figure 31:
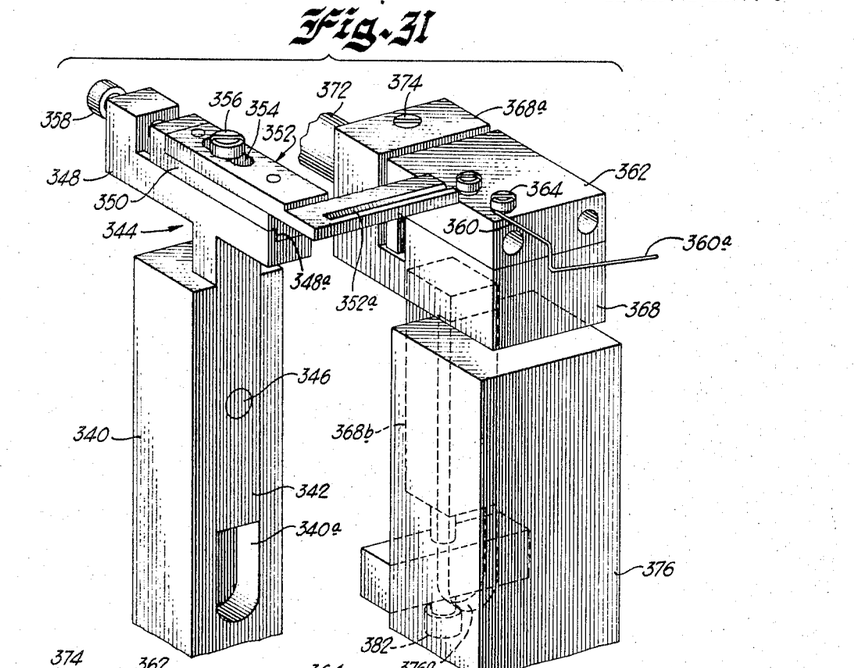
FIG. 31 is a perspective view of an assembly for guiding the upper reeds during insertion into the glass tubes and an assembly for biasing the lower reed away from the center of the tubes.
Figures 33, 34:
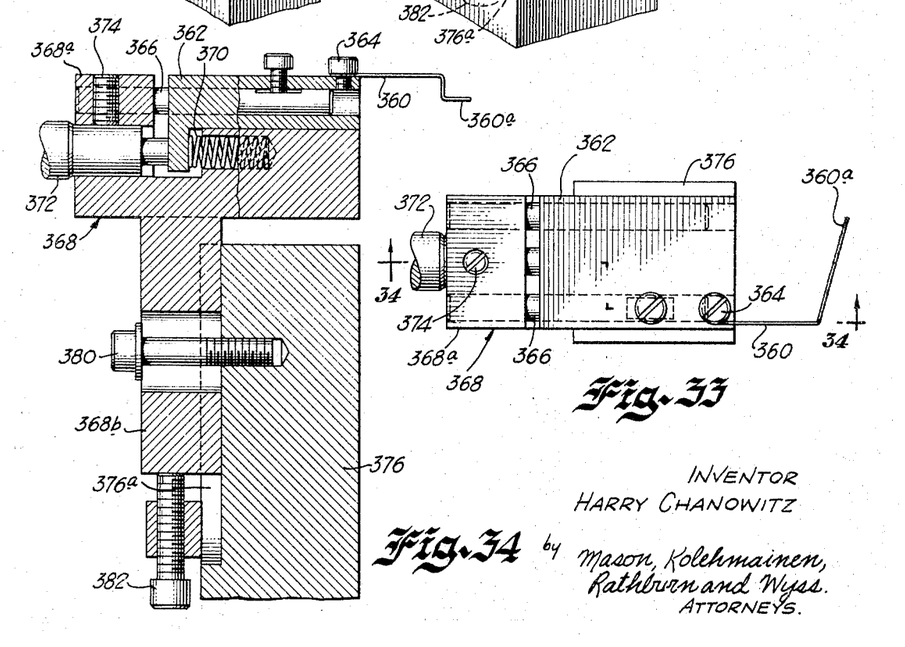
FIG. 33 is a top plan view of the lower reed biasing assembly of FIG. 31.
FIG. 34 is an elevational sectional view taken substantially along the line 34—34 of FIG. 33.

As can be seen from the views of FIG. 31 and FIG. 33, the finger 360 includes a camming leg 360a which extends inwardly at a line tangent the circular path of reed movement in the direction of movement to contact the moving reeds. The finger exerts a gradually increasing resilient camming force on each passing reed until the reed passes the end of the leg 360a, at which time the upper reed has been fully inserted.

The finger 360 is secured to an adjustable head 362 by means of a cap screw 364 and the head is movable horizontally on a pair of pins 366 which extends outwardly from an upstanding lip 368a of a cradle member 368. The head 362 is biased rearwardly by a spring 370 (FIG. 34) and a stop pin 372 and setscrew 374 are provided to hold the head at a selected position against the force of the spring. The cradle 368 also includes a downwardly depending leg 368b which is vertically slidable in a slot 376a provided in an upstanding support post 376. The leg 368b is slotted to receive a cap screw 380 which holds the leg in place, and a vertical adjusting screw 382 is provided to adjust the height of the assembly.

By resiliently biasing the lower reeds 46 away from the center of the tubes after their insertion and during the final phase of insertion of the upper reeds 44, problems of reed bending during insertion because of end-to-end abutment have been eliminated.

The apparatus of the present invention provides many improvements over previous switch-making machines and the new methods of the present invention likewise are highly advantageous from a cost and time standpoint over the methods of the prior art.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for feeding tubes of sealed switches into chuck means moving in a circular path, said apparatus comprising tube-feeding means in fixed location relative to said path, said feeding means including tube guide means extending upwardly from and axially aligned with a point on said path for holding a supply of tubes in end-to-end relation above said path, pawl means movable from a tube-holding position wherein a tube in a lowest position in said guide means is prevented from feeding downwardly out of said guide means into said chuck means to a released position wherein said tube is released to feed downwardly into said chuck means, and means for moving said pawl means to said released position when said chuck means passes into a tube-receiving position directly below said guide means, said feeding means also including holding means engageable with a tube in said guide means at a second lowest position above said lowest position movable to hold said tube in said second lowest position when said pawl means is in said released position and to release said tube to fall to said lowest position when said pawl means is in said tube-holding position.

2. Apparatus as defined in claim 1 wherein said holding means includes resiliently biased means for holding tubes in said second lowest position against a wall of said guide means.

3. Apparatus as defined in claim 1 wherein said holding means and pawl means include a pivotally mounted lever means, and including solenoid means for moving said lever means to feed a tube into said chuck means.

4. Apparatus for feeding elongated magnetic switch elements of sealed switches and the like into chuck means moving along a path, said apparatus including switch element feeding means disposed in a fixed position relative to said path, said feeding means including guide means extending along a central axis intersecting a fixed point on said path for aligning a plurality of switch elements in end-to-end, stacked relation, and magnetic support means positioned below said fixed point for supporting the lower end of and magnetizing a switch element resting in a lowest position along said axis extending through said path, said guide means including an attracting surface of magnetic material spaced above said magnet support means and extending adjacent the upper portion of a switch element in said lowest position for maintaining said element in an upstanding position by magnetic attraction until picked up by said chuck means as it moves past and fixed point.

5. Apparatus as defined in claim 4 wherein said attracting surface comprises a wall of a slot which is open in the direction of movement of said chuck means along said path to permit withdrawal in said direction of the switch element in said lowest position by said chuck means.

6. Apparatus as defined in claim 4 wherein said magnet support means is adjustable along said axis toward and away from said path.

7. Apparatus as defined in claim 4 wherein said guide means comprises downwardly extending slot means having guide surfaces therein for directing said switch elements passing downwardly therethrough into a selected rotational position about their longitudinal axes in relation to said path.

8. Apparatus for feeding magnetic switch elements of sealed switches and the like into chuck means moving along a path, said apparatus comprising switch element feed means disposed in fixed relation to said path, said feed means including guide means extending along a central axis intersecting a fixed point on said path for aligning a plurality of switch elements in end-to-end stacked relation along said axis, and magnet support means positioned below said fixed point for supporting the lower end of and magnetizing a switch element resting in a lowest position along said axis extending through said path, said guide means including an upper guide member above said path and a lower guide member below said path spaced above said magnet support means, said lower member including an attractive surface of magnetic material spaced from said magnet support means and extending adjacent a portion of a switch element in said lowest position for maintaining said element in upstanding position by magnetic attraction until picked up by said chuck means as it moves past said fixed point.

9. Apparatus as defined in claim 8 wherein said upper and lower guide means include axially aligned slot means having guide surfaces therein for directing switch elements passing downwardly therethrough into selected rotational position about their longitudinal axes in relation to said path.

10. Apparatus as defined in claim 8 wherein said attracting surface forms a wall of a slot which is open in the direction of movement of said chuck means along said path to permit withdrawal in said direction of the switch element in said lowest position by said chuck means.

11. Apparatus as defined in claim 8 wherein said magnet support means is movable along said axis toward and away from said path.

12. Apparatus for making sealed switches of the type including a dielectric tube and at least one switch element inserted into said tube, said apparatus comprising movable tube chuck means for holding tubes in position for insertion of a switch element therein, switch element chuck means movable with said tube chuck means and relative thereto for inserting a switch element into said tube from one end thereof, and means in fixed relation to said moving chuck means for resiliently camming said switch element held by said chuck means during insertion in said tube to deflect the inserted end of said element away from the center of said tube.

13. Apparatus for making sealed switches of the type including a dielectric tube and a pair of magnetic switching elements inserted therein from opposite ends of the tube, said apparatus comprising a head assembly movable in a path and including tube chuck means for holding a tube and a pair of switch element chuck means on opposite sides thereof for holding and inserting switch elements into said tube, means for moving each of said switch element chuck means toward said tube chuck means in selected phase relation to insert first one and then another switch element into said tube, and means for deflecting said one element away from the center of said tube during insertion of the other switch element.

14. Apparatus for making sealed switches of the type including a dielectric tube and a pair of magnetic switch elements sealed in opposite ends thereof, said apparatus including a head assembly movable on a path, said head assembly including tube chuck means and a pair of switch element chuck means on opposite sides thereof for holding switch elements in axial alignment with a tube held by said tube chuck means, said chuck means movable with respect to each other for inserting the switch elements into opposite ends of said tube, tube feed means in first fixed location relative to said path for releasing tubes to fall by gravity, one at a time, into the tube chuck means upon passing said first fixed location, a pair of switch element feed means disposed at spaced second and third fixed locations relation to said path for magnetically holding the switch element in upstanding position for pickup by the respective switch element chuck means passing said respective locations, means for moving the respective chuck means of said head assembly relative to one another at selected time intervals to insert first one switch element and then the other into said tube, and resilient biasing means disposed at a fourth fixed location relative to said path for deflecting said one switch element away from the center of said tube during insertion of the other switch element.

References Cited

UNITED STATES PATENTS

| | | | |
|---|---|---|---|
| 3,061,144 | 10/1962 | Brewer et al. | 221—13 |
| 3,268,317 | 8/1966 | Blust. | |
| 3,282,670 | 11/1966 | Chanowitz et al. | 65—59 |

THOMAS H. EAGER, *Primary Examiner.*